US006442403B1

(12) United States Patent
Becot et al.

(10) Patent No.: US 6,442,403 B1

(45) Date of Patent: Aug. 27, 2002

(54) DEVICE AND METHOD FOR COMMUNICATING AT A DISTANCE AND SYSTEM USING THEM

(75) Inventors: Sylvain Becot, Le Rheu; Alain Caillerie, Rennes; François Delumeau, Rennes; Pierre Visa, Rennes; Stéphane Gouache, Rennes, all of (FR)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 09/377,837

(22) Filed: Aug. 20, 1999

(30) Foreign Application Priority Data

Aug. 31, 1998 (FR) ........................................ 98 10887

(51) Int. Cl.$^{7}$ ........................................ H04B 1/38

(52) U.S. Cl. ........................ 455/556; 455/66; 455/41; 455/88

(58) Field of Search ........................ 455/66, 504, 562, 455/41, 556, 88; 342/359; 343/763, 766; 358/1.15

(56) References Cited

U.S. PATENT DOCUMENTS

| | | | | | |
|---|---|---|---|---|---|
| 3,503,070 | A | * | 3/1970 | Kompfner | 343/100 |
| 5,355,520 | A | * | 10/1994 | Freeburg et al. | 455/53.1 |
| 5,437,055 | A | | 7/1995 | Wheatley, III | 455/33.3 |
| 5,524,185 | A | * | 6/1996 | Na | 395/114 |
| 5,682,379 | A | * | 10/1997 | Mahany | 370/311 |
| 5,805,807 | A | * | 9/1998 | Hanson et al. | 395/200.09 |
| 5,854,609 | A | * | 12/1998 | Pyo et al. | 342/359 |
| 6,002,364 | A | * | 12/1999 | Kroeger et al. | 342/359 |
| 6,124,832 | A | * | 9/2000 | Jeon et al. | 343/711 |

FOREIGN PATENT DOCUMENTS

| | | |
|---|---|---|
| EP | 0 623 966 A1 | 11/1994 |
| WO | WO 96/41426 | 12/1996 |
| WO | WO 97/16012 | 5/1997 |

* cited by examiner

*Primary Examiner*—Daniel Hunter
*Assistant Examiner*—Lana Le
(74) *Attorney, Agent, or Firm*—Fitzpatrick, Cella, Harper & Scinto

(57) ABSTRACT

The device (220) of the invention for communicating at a distance has a signal transmission/reception means (223, 224, 102) which has a moving part (102) and a reception device (102, 223, 224), said moving part modifying the electromagnetic environment of said reception device.

Figure 1:
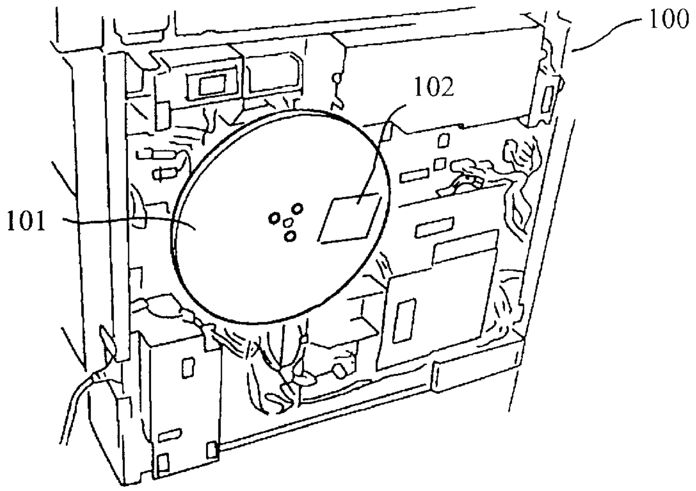

Preferentially, said moving part is an antenna (102).

In particular, said moving part can be fixed to a moving component of an item of office equipment (100) using data received by said communication device.

29 Claims, 10 Drawing Sheets

DEVICE AND METHOD FOR COMMUNICATING AT A DISTANCE AND SYSTEM USING THEM

The present invention concerns a device and method for communicating at a distance and systems using them. It is situated mainly in the field of wireless networks.

In an office environment the characteristics of propagation and attenuation of electromagnetic waves are continually changing. For radio communications indoors, the electromagnetic waves can take a multitude of possible paths (particularly at certain frequencies). The different waves which arrive at the antenna of the receiver interfere constructively or destructively. Consequently, at some points, the signal is greatly attenuated, which is what is referred to as fading.

If the antenna of the receiver is situated in a fade area, the signal received is too greatly attenuated for the radio communication to be able to take place.

There are many means for mitigating the problems of multiple paths. Notably antenna diversity, frequency jumping etc.

The document U.S. Pat. No. 5,437,055 describes a system for minimising the effects of multiple paths. For this purpose the author proposes to provide the antenna with a real or simulated movement. In order to simulate the movement, the inventor proposes to vary the phase of the signal, which makes it possible to change the apparent position of the antenna, without moving physically.

In such networks, the signals are reflected by the walls and absorbed by certain materials, and problems of signal fading arise (these problems are related to the interference signals which have followed different parts).

During a given interval of time, at a few centimeters distance, the reception of the same signal sent can thus be of good quality or poor quality.

The present invention aims to remedy these drawbacks.

To this end, the present invention relates, according to a first aspect, to a device for communicating at a distance having a signal transmission/reception means, characterised in that the said transmission/reception means has a moving part and a receiving device, the said moving part cyclically modifying the electromagnetic environment of the said receiving device.

The movement given to the antenna prevents it being situated in a fade area throughout the period of transmission of the data. This makes it possible to obtain a mean value of the received signal so as to increase the robustness of the radio transmission.

The document U.S. Pat. No. 5,437,055 proposes, in a preferred embodiment, to fix the antenna to a rotating part. However, it provides no teaching concerning the moving part. In fact, it does not indicate how to choose and control the speed of rotation of the antenna, according to the quality of reception. The invention described here gives the method and means of choosing and controlling the speed.

According to the invention, if the antenna of the receiver is situated in a fade area (the signal received is then too attenuated for radio communication to be able to take place), the antenna of the receiver or transmitter is moved in order to move out of this fade area and to regain correct conditions so as to ensure the transmission of data.

The method and device thus make it possible to get rid of the problems of multiple paths by providing a movement, for example for the reception antenna.

This is because, when the radio data transmission device is associated with an appliance (copier, facsimile machine, printer etc) having at least one moving part, it is possible to use the latter in order to fix the receiver antenna thereto. The movement of the antenna thus makes it possible to use an average of the fading effects.

According to a first embodiment, when the office equipment which incorporates the device according to the present invention is in a standby state (no printing or copying) the moving element will be moved so as to place an antenna in an optimum position.

According to a second embodiment, when the office equipment which incorporates the device according to the present invention is in an operating state, the movable element (for example an inertia flywheel) rotates uniformly and an antenna fixed to this will successively be situated in areas of good reception and fading. A first analysis of the fading will enable the device to modify the transmission conditions.

According to a first aspect, the present invention relates to a device for communicating at a distance having a signal transmission/reception means, characterised in that said transmission/reception means has a moving part and a reception device, said moving part modifying the electromagnetic environment of said reception device.

The present invention has the advantage of being simpler than the systems with several antennae or frequency jumping. In addition, it makes it possible to use a moving part of an appliance in order to give it an additional function.

According to particular characteristics, said moving part is an antenna. By virtue of these provisions, said antenna can move from a minimum to a maximum communication quality.

According to other particular characteristics, said moving part is fixed to a moving component of an item of office equipment, said office equipment using data received by means of said communication device.

Thus the present invention is particularly easy to implement.

According to other particular characteristics, said moving part effects a cyclic movement so that the modification to the electromagnetic environment caused by said movement has the same cycle period as the movement of said moving part.

By virtue of these provisions, the antenna regularly returns to a good communication area.

According to other particular characteristics, the device according to the invention, as succinctly disclosed above, has a means of determining a mean duration of periods of good communication.

By virtue of these provisions, communication parameters can be adjusted according to said duration.

According to other particular characteristics, the communication device as succinctly disclosed above has a frame duration determination means, adapted so that said frame duration is less than or equal to the mean duration of the periods of good communication.

By virtue of these provisions a frame can be communicated during the majority of the periods of good communication.

According to other particular characteristics, the communication device as succinctly disclosed above has:

- a means of determining a new cycle duration equal to or greater than the product of the former cycle duration and the ratio of the duration of a data frame, used by the communication means, to the period of good communication, and
- a means of controlling the duration of the cycle adapted to compel said cycle to have said new cycle duration.

By virtue of these provisions, a frame can be communicated during the majority of the periods of good communication.

According to other particular characteristics, the communication device as succinctly disclosed above has:

a good communication cycle ratio determination means, adapted to determine the mean ratio of the duration of good communication during a cycle over the duration of said cycle, and a means of determining a ratio of redundancy information associated with data to be communicated, said ratio being a function of the good communication cycle ratio.

By virtue of these provisions, the number of items of redundancy information necessary for the correction of errors caused by communication quality defects can be associated with the data to be communicated.

According to particular characteristics, the communication device as succinctly disclosed above has a good communication determination means and, when said good communication determination means determines that the communication is not good, said moving part is set in movement.

By virtue of these provisions, when the communication is good, the moving part can remain in place whilst, when the communication is not of good quality, the moving part is set in movement in order to adopt a position where the communication is of good quality.

According to a second aspect, the present invention relates to a method of communicating at a distance characterised in that it includes a step of setting in movement a moving part of a signal transmission/reception means.

The invention also relates to a network, a computer, a copier, a facsimile machine, a printer, a scanner, a camera and an information terminal, characterised in that they have a device as succinctly disclosed above.

The invention also relates to:

an information storage means which can be read by a computer or microprocessor storing instructions of a computer program characterised in that it makes it possible to implement the method of the invention as succinctly disclosed above, and an information storage means which is removable, partially or totally, and which can be read by a computer or microprocessor storing instructions of a computer program characterised in that it makes it possible to implement the method of the invention as succinctly disclosed above.

The preferential or particular characteristics, and the advantages of this device, this network, this computer, this copier, this facsimile machine, this printer, this scanner, this camera, this information terminal and these information storage means being identical to those of the method as succinctly disclosed above, these advantages are not repeated here.

Figure 3:
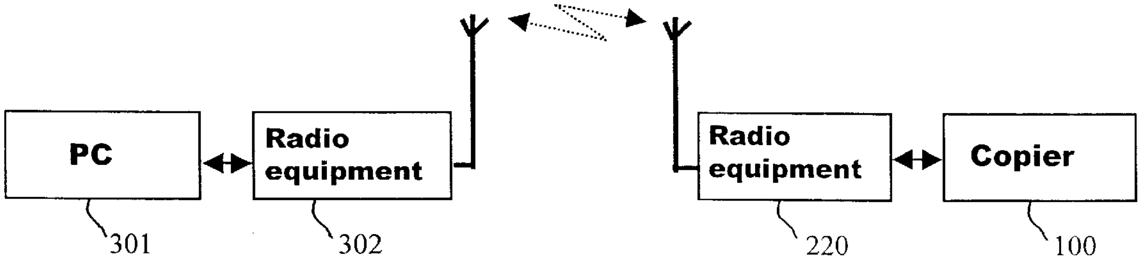
Figure 2:
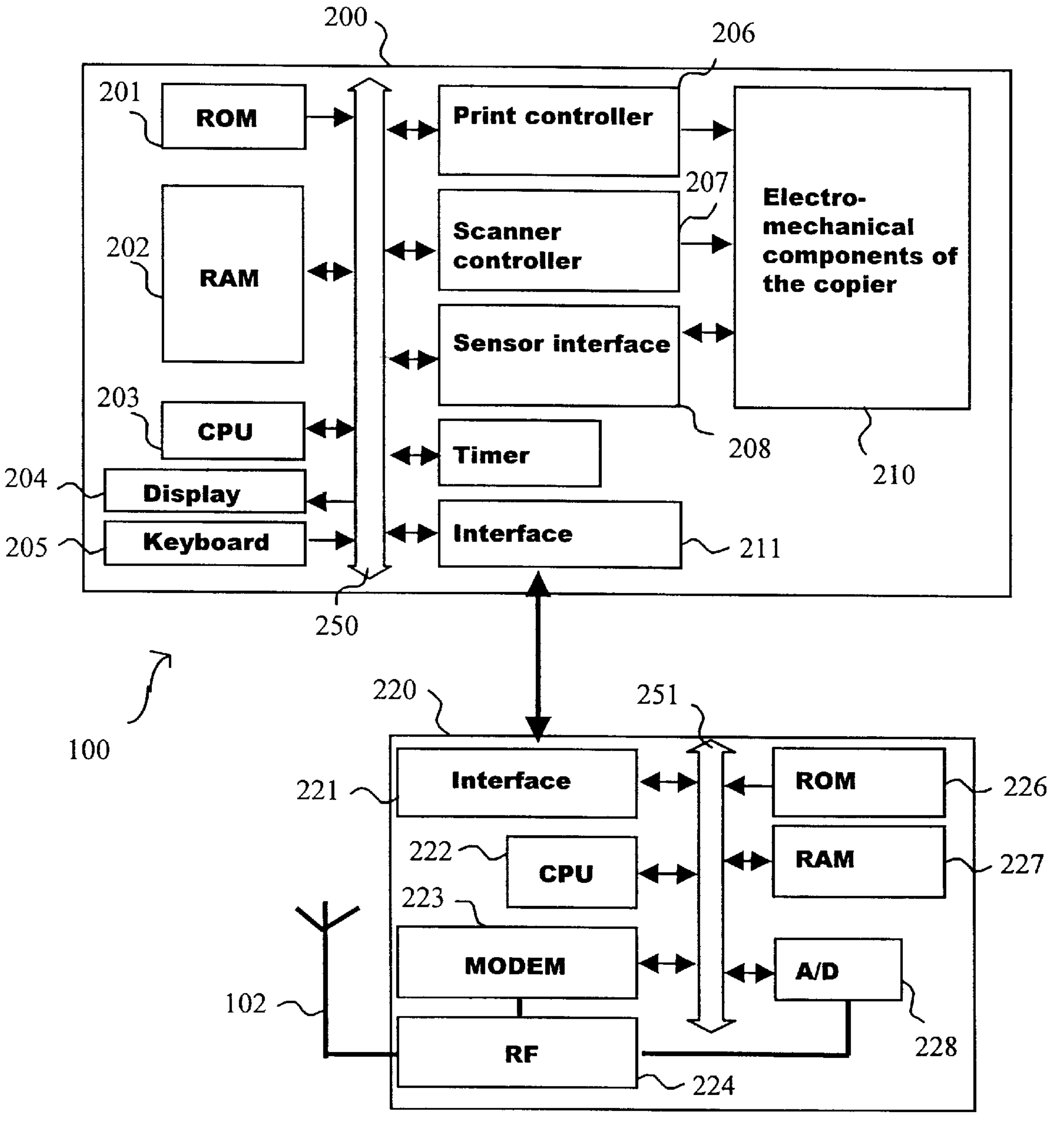
Figure 4:
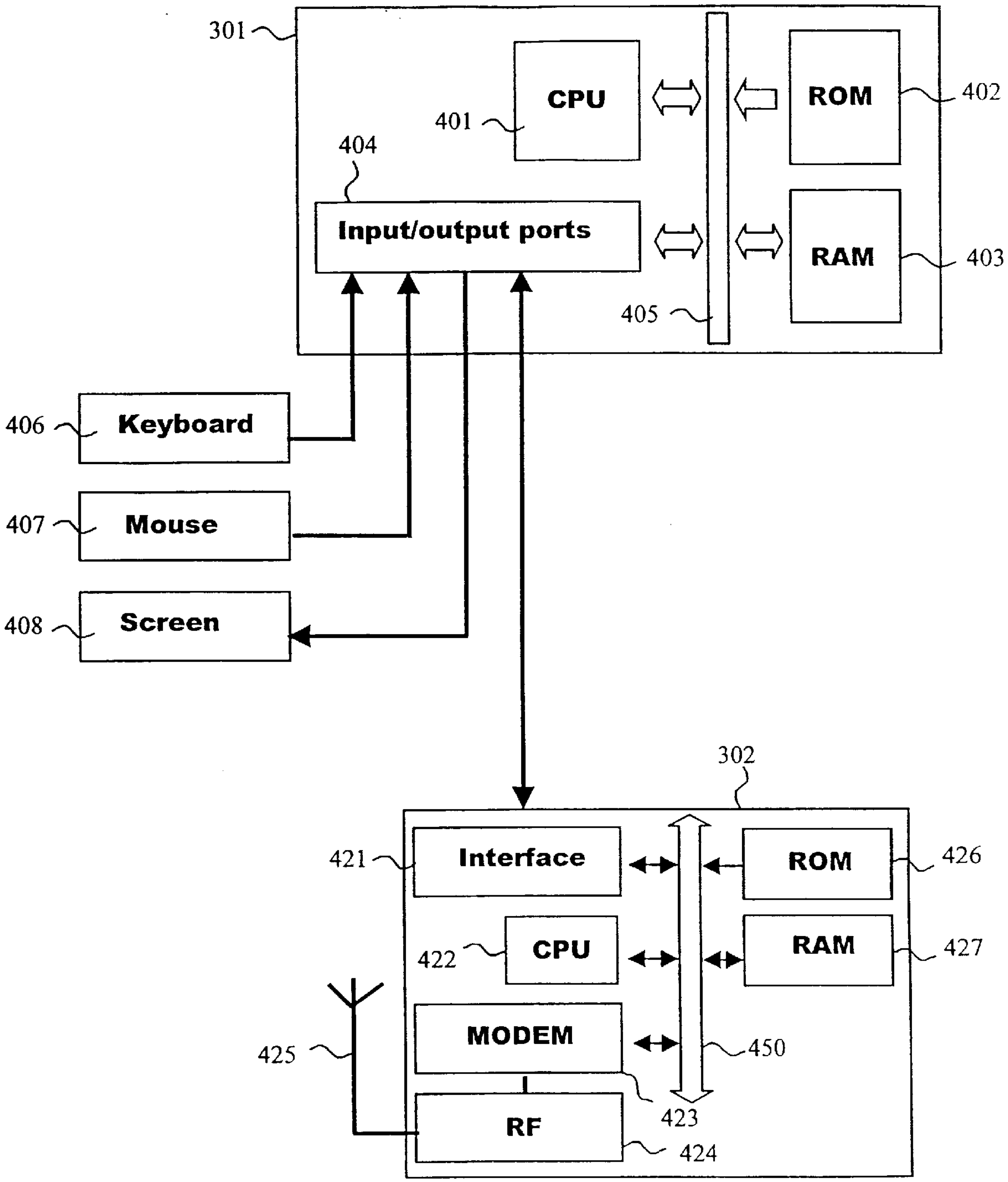
Figure 5:
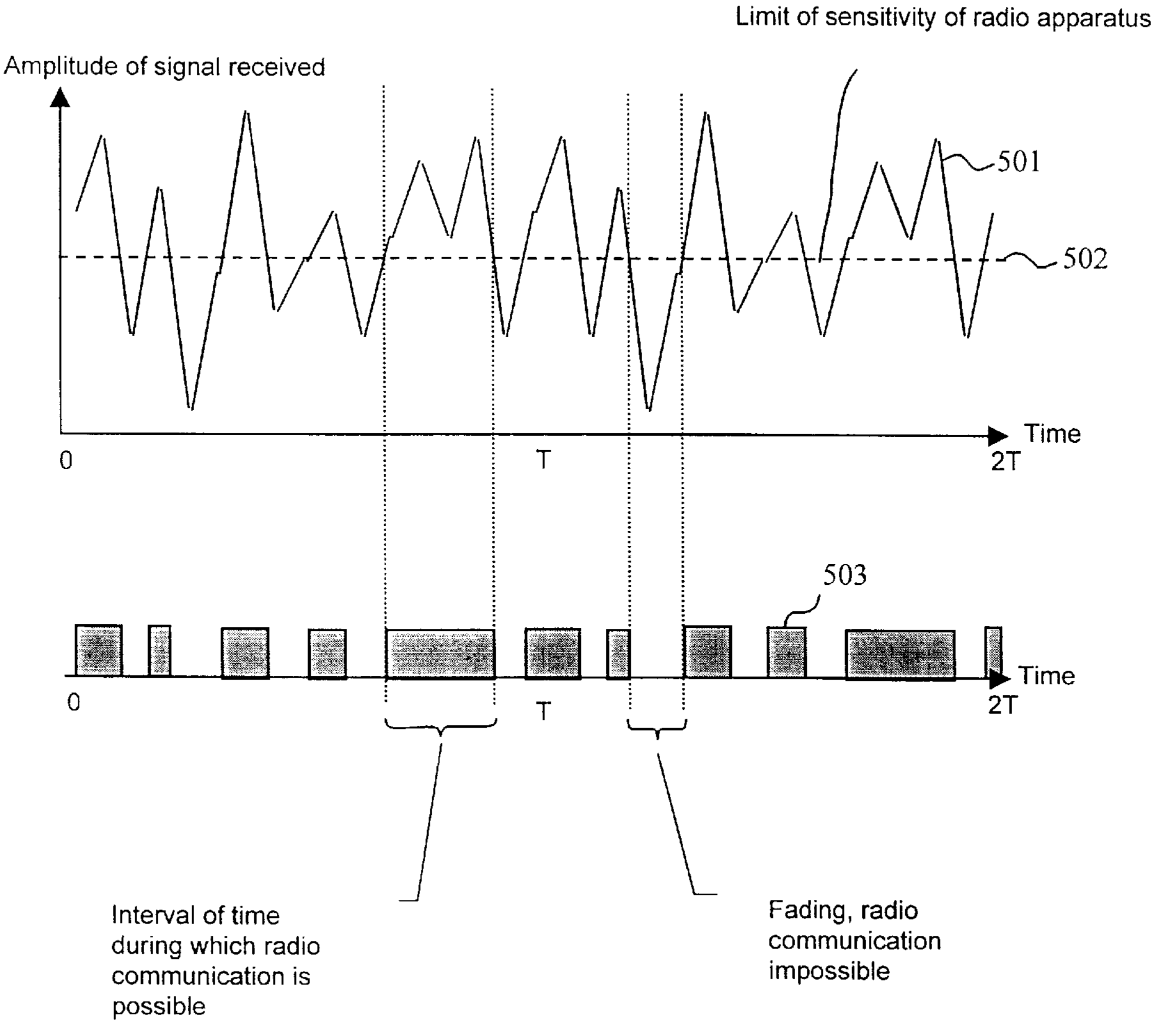

Other advantages, aims and characteristics of the present invention will emerge from the following description, given with regard to the accompanying drawings, in which:

FIG. 1 depicts, in perspective, in a simplified and partial fashion, a first embodiment of the device which is the object of the present invention in an item of office equipment, FIG. 2 depicts schematically an electronic circuit incorporated in the equipment illustrated in FIG. 1, FIG. 3 depicts a communication system according to the invention, FIG. 4 depicts schematically an electronic circuit of a transmission and reception device placed at a distance from the equipment illustrated in FIGS. 1 and 2 and communicating with it, FIG. 5 depicts an example of a curve representing the transmission quality, when the invention is implemented with a rotating system.

Figure 6:
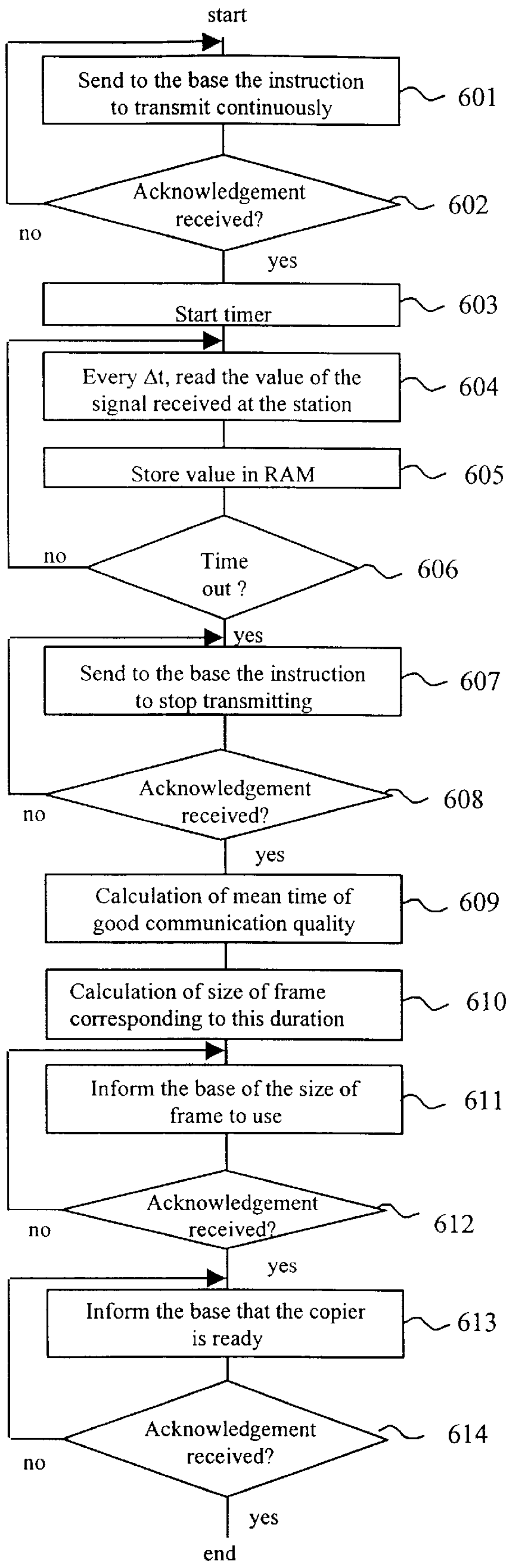
Figure 7:
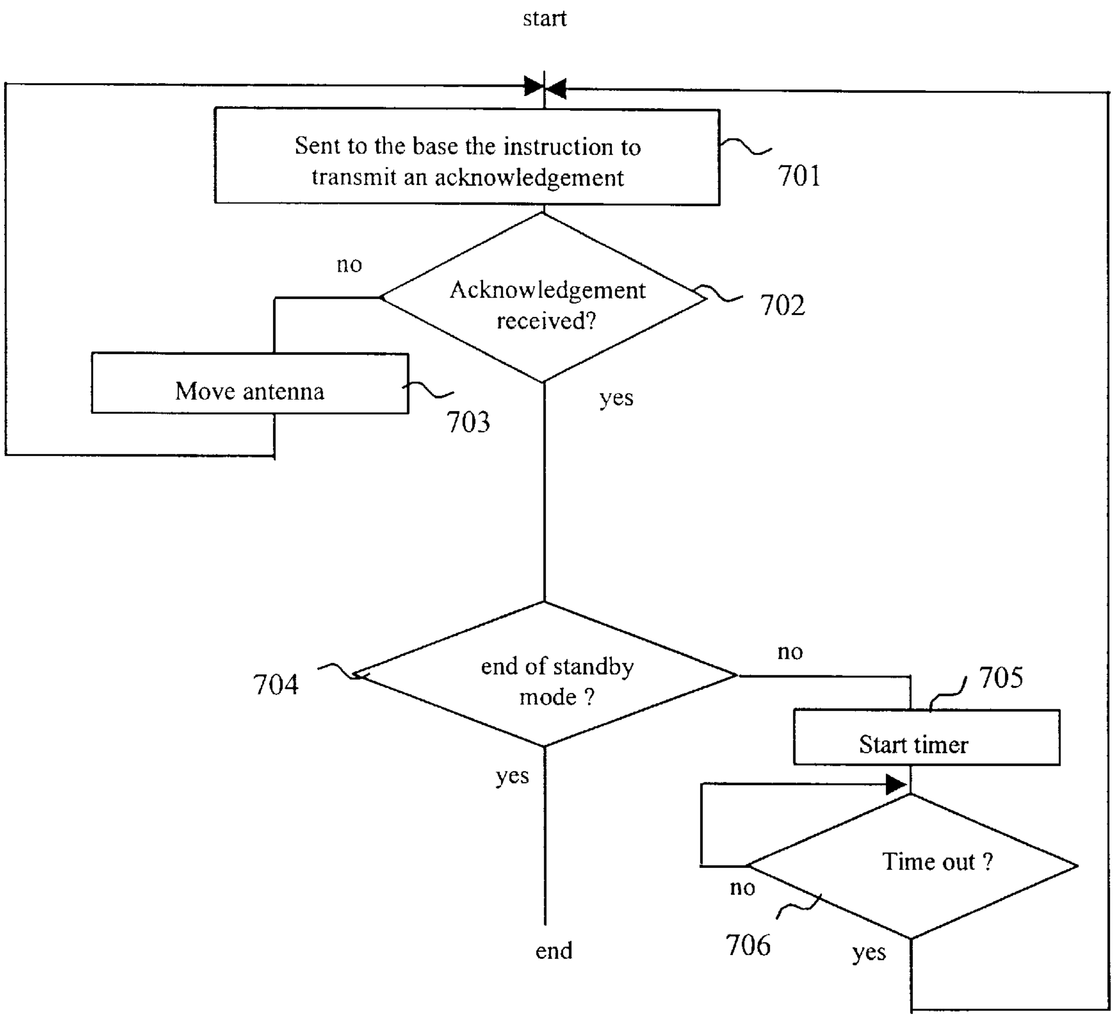
Figure 8:
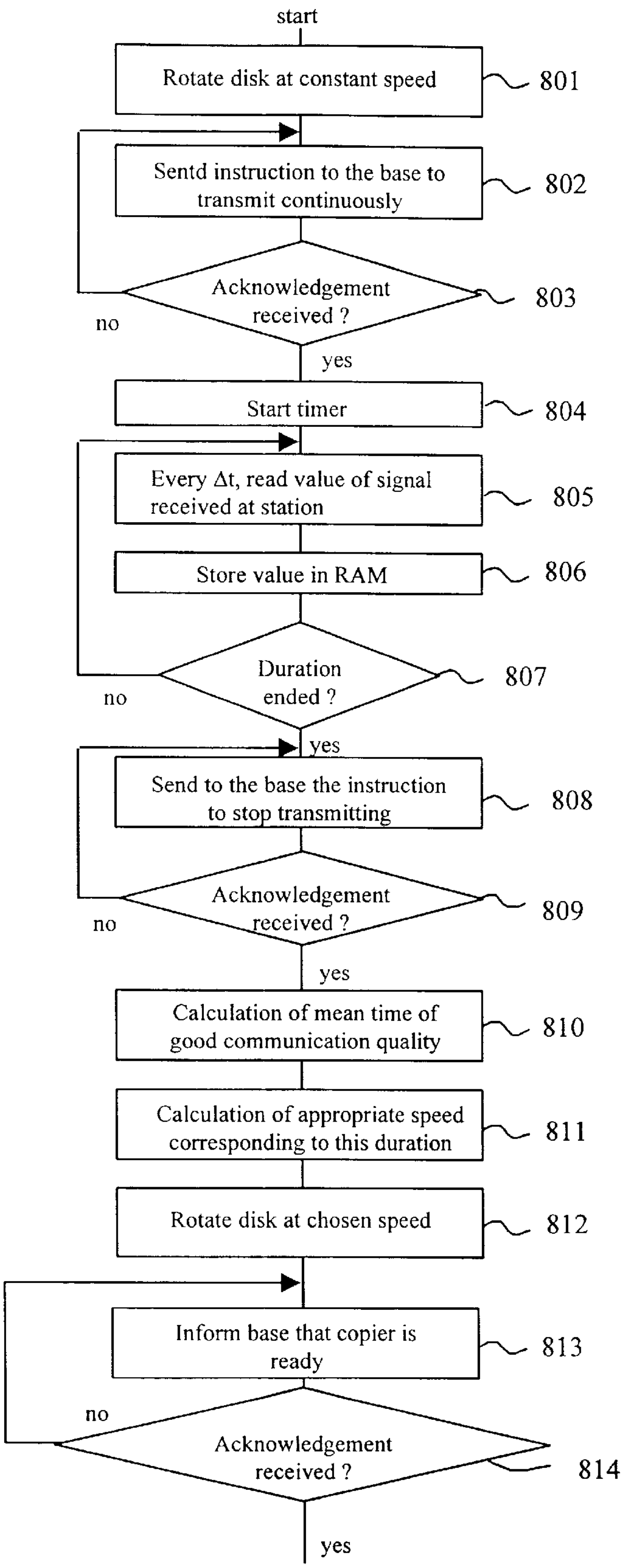
Figure 9:
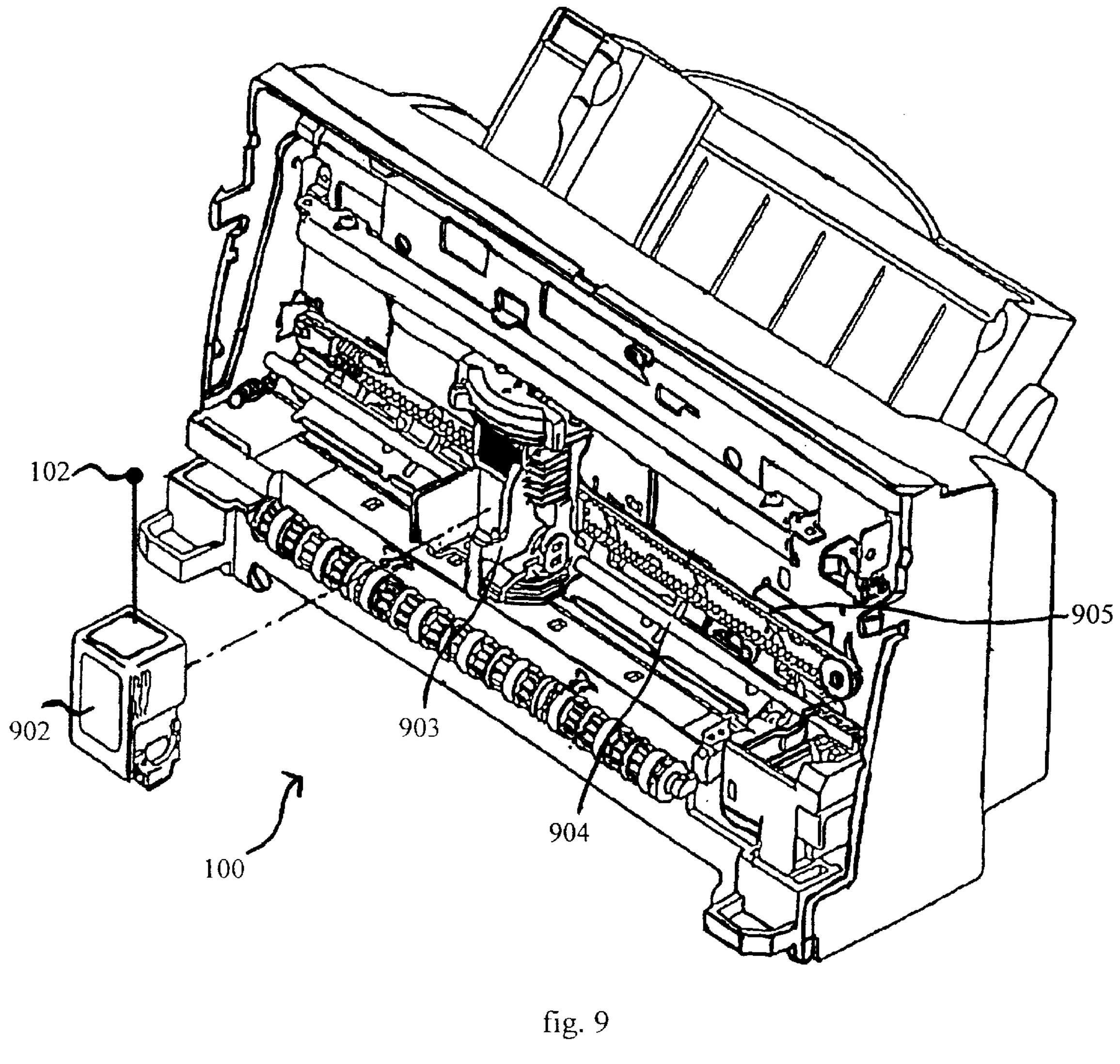
Figure 10:
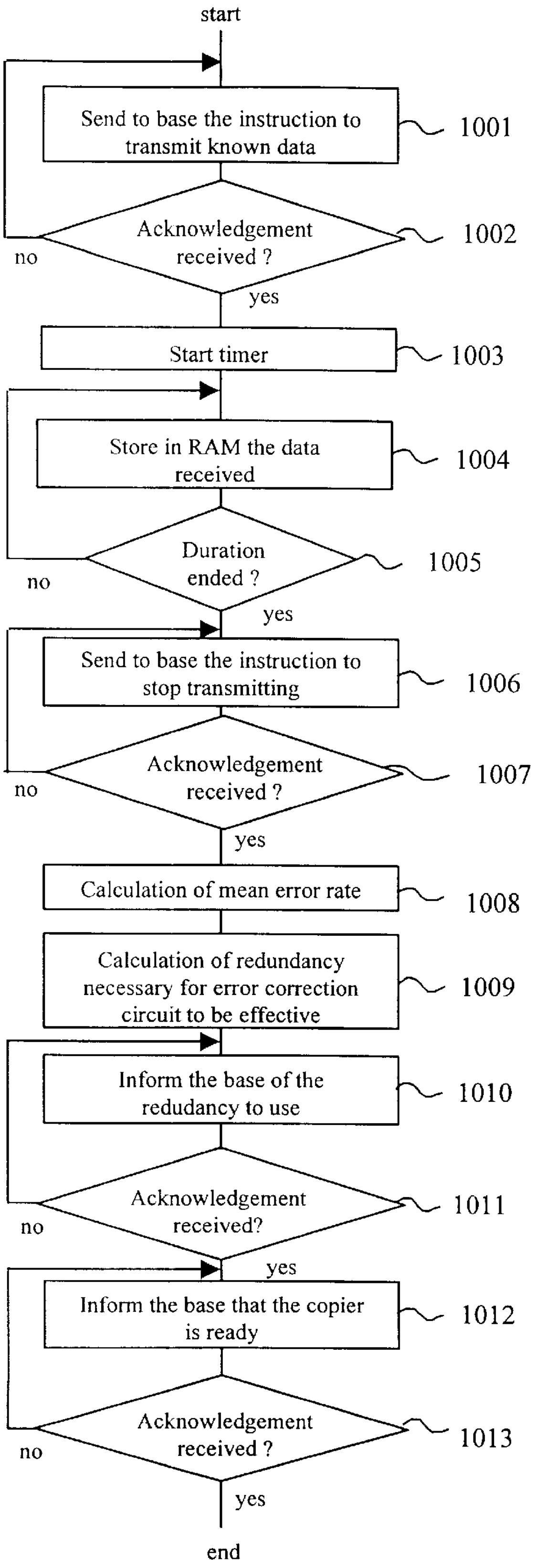
Figure 11:
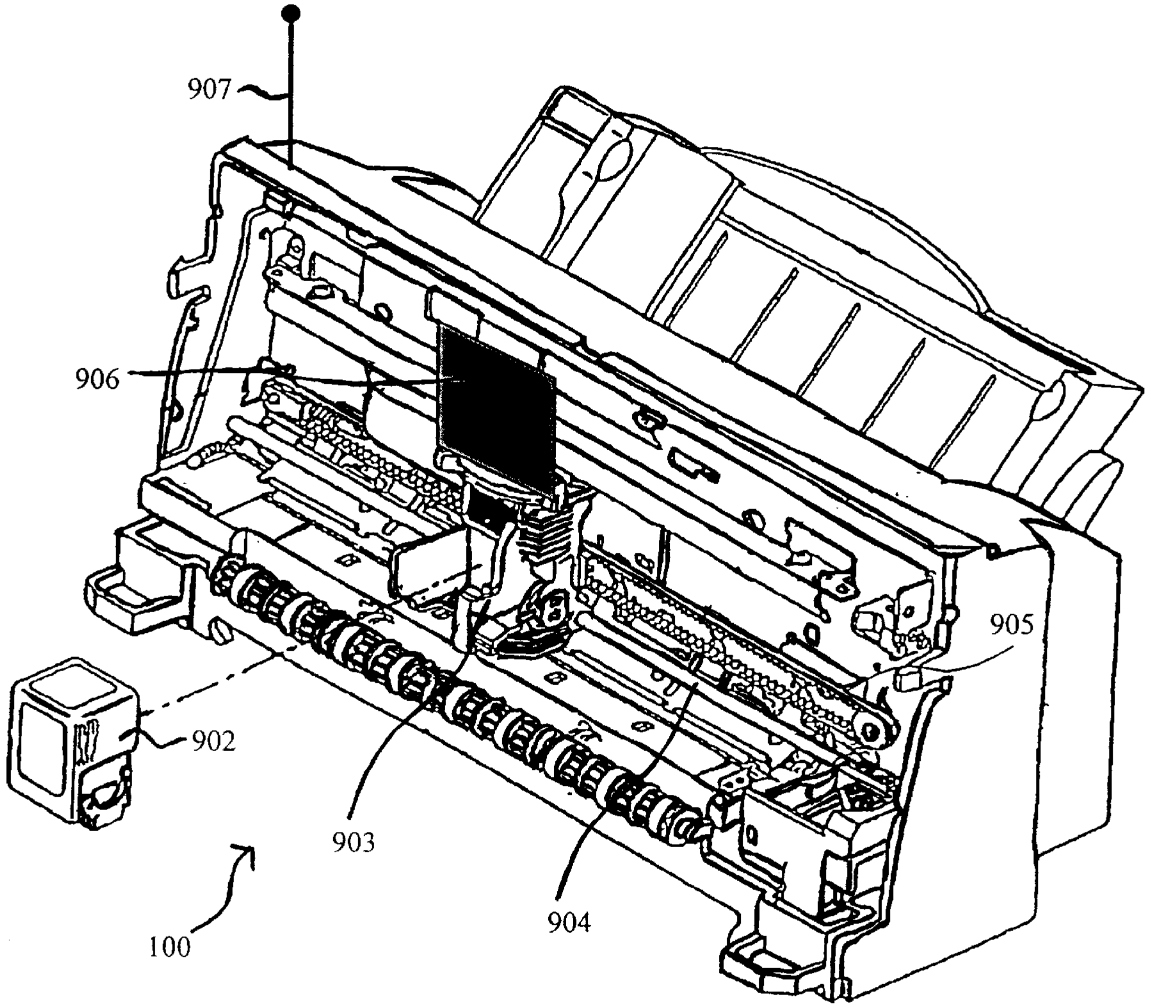

FIG. 6 depicts a flow diagram of the sub-program implementing the invention in a first operating mode, FIG. 7 depicts a flow diagram of the sub-program implementing the invention in a second operating mode, FIG. 8 depicts a flow diagram of the sub-program implementing the invention in a third operating mode, FIG. 9 depicts a second embodiment of the present invention, FIG. 10 depicts another operating mode of the device illustrated in FIGS. 1 to 5, slightly modified, and FIG. 11 depicts a third embodiment of the present invention.

FIG. 1 is a view in perspective of the rear part of a copier 111 which has an inertia flywheel 101 to which an antenna 102 is fixed. The antenna 102 makes it possible to transmit and receive radio data. The copier 100 is conventional and well known to persons skilled in the art and will not be described any further.

The invention applies here to an image transfer system incorporated in the copier 100, which has an electronic circuit 200 (FIG. 2). The circuit 200 has a central unit (or main processing circuit) 203, associated with a read only memory 201 and a random access memory 202, by means of a bus 250.

The read only memory 201 contains operating programs for the main processing circuit 203, whilst the random access memory 202 temporarily stores the data received from the radio module 220 by means of the interfaces 211 and 221, as well as the data processed by the main processing circuit 203. The main processing circuit 203 is connected to a display 204, on which it demands the display of messages representing the state of the copier.

The main processing circuit 203 is also connected to a keypad 205, having at least one switch (not shown), by means of which the user can transmit operating commands to the copier 100.

The main processing circuit 203 is connected to the electromechanical components 210 of the copier 100, by means of interfaces 206, 207 and 208. The interface 208 enables the main processing circuit 203 to control motors (not shown) which ensure the transportation of sheets and which drive the movable parts whose movement is necessary to the functioning of the copier. The interface 208 also makes it possible to connect the main processing circuit 203 to the sensors (not shown) which give information to it on the state of the copier 100.

The circuit 200 also has a print controller 206 which enables the main processing circuit 203 to control the electromechanical components 210 responsible for the printing. The circuit 200 also has a controller 207 which enables the main processing circuit 203 to control the electromechanical components 210 responsible for the image acquisition.

The circuit 200 receives data to be printed by means of radio equipment 220.

These two appliances, copier 100 and radio equipment 220, have compatible interfaces 211 and 221 which enable them to exchange data. The radio equipment 220 also has a main data processing circuit 222, associated with a read only memory 226 and a random access memory 227, by means of a bus 251. The read only memory 226 contains operating programs for the main processing circuit 222, whilst the random access memory 227 temporarily stores the data received from another analogue radio module 302 (FIG. 4), and the data processed by the main processing circuit 222.

The main processing circuit 222 is connected to an analogue to digital converter 228, which quantifies the level of the radio signal received. The main data processing circuit 222 is connected to a modulation and demodulation circuit 223, converting the binary information streams into analogue signals. The modulation and demodulation circuit 223 is connected to an RF stage 224 which amplifies the signals and transposes them in frequency. Finally the RF stage 224 uses the antenna 102 to receive and transmit the radio waves.

The copier 100 and radio equipment 220 previously described are conventional and well known to persons skilled in the art. They will therefore not be detailed any further here.

FIG. 3 depicts a general diagram enabling the invention to be implemented. Two items of analogue radio equipment 302 and 220 make it possible to cause a computer 301 and copier 100 to communicate using a radio channel. The data exchange can take place bidirectionally, the items of radio equipment each being, in turn, a transmitter and a receiver. This circuitry makes it possible to implement printing applications, that is to say printing by the copier 100 of files coming from the computer 301.

According to variants, not shown, the radio equipment 302 is incorporated in the computer 301 and/or the radio equipment 220 is incorporated in the office equipment 100.

FIG. 4 depicts the main components of the computer 301 and an item of radio equipment 302 implementing the present invention. The computer 301 has an architecture known in the field of programmable electronic systems, based on the use of components connected together by a bus 405 and a central unit 401. The computer 301 is a personal computer, of a known type, for example of the type operating with a Pentium™ microprocessor 401 from the company lntel™, which has at least one random access memory RAM 403, a non-volatile memory ROM 402, a screen 408, a mouse 407 and a keyboard 406.

An input/output port 404 receives the digital information coming from the user, by means of the keyboard 406, the mouse 407 or any other communication means, and transmits them, under the control of the central unit 401, to a random access memory RAM 403.

In addition, the input/output port 404 transmits, under the control of the central unit 401, to the screen 408, the data intended to be displayed. The input/output port 404 is also associated with the radio module 302. The latter makes it possible to send data to the radio equipment 220 of the copier 100, or to receive them from it.

The random access memory RAM 403, of a known type, contains registers intended to receive parameters, variables, digital data and intermediate processing values.

The non-volatile memory 402, of a well known type, stores the program which enables the computer 301 and, in particular, the central unit 401, to operate.

The radio equipment 302 is also composed of a main data processing circuit 422, associated with a read only memory 426 and a random access memory 427, by means of a bus 450. The read only memory 426 contains operating programs for the main processing circuit 422, whilst the random access memory 427 temporarily stores the data received from the analogue radio module 220 (FIG. 2) as well as the data processed by the main processing circuit 422.

The main data processing circuit 422 is connected to a modulation and demodulation circuit 423, converting the binary information streams into analogue signals.

The modulation and demodulation circuit 423 is connected to an RF stage 424 which amplifies the signals and transposes them in frequency. Finally, the RF stage 424 uses an antenna 425 for receiving and transmitting the radio waves.

FIG. 5 is an example of a radio transmission quality curve, when the antenna 102 is fixed to the inertia flywheel 101 of the copier 100.

The first graph 501 gives the amplitude of the signal received at the antenna 102 as a function of time. The time axis is graduated so as to show the period T corresponding to the time taken by the antenna and inertia flywheel to make one complete revolution.

The broken line 502 corresponds to the limit of sensitivity of the radio apparatus 220. When the amplitude 501 of the signal received is less than this limit 502, the radio apparatus 220 cannot detect the signal.

The following graph 503 gives the intervals of time during which radio communication can take place correctly. This graph was derived from the previous one by considering the times where the amplitude 501 of the signal received is greater than the sensitivity limit 502 (radio communication possible) and those where the amplitude 501 of the signal received is less than the sensitivity limit 502 (the antenna is in a fade area).

FIG. 6 illustrates the flow diagram of the sub-program resident in the read only memory 201 of the copier 100, and implementing the method of the present invention. This sub-program is executed each time the copier 100 is initialised.

It is assumed here that the antenna 102 is fixed to the inertia flywheel 101 of the copier 100 and that it rotates uniformly during the use of the copier 100.

It will be observed that, in another embodiment presented in FIG. 9, the antenna 102 is fixed to a carriage or to an ink cartridge of a printing device using inkjet printing technology, and it is also assumed that the movement takes place at a constant speed.

With regard to FIG. 3, it is convenient henceforth to arbitrarily refer to the radio equipment 302 connected to the computer 301 as the "base", and the radio equipment 222 connected to the copier 100 the "station".

During an operation 601, the central unit 203 sends to the base 302 the instruction to transmit data continuously. The instruction is sent until it is acknowledged by the base 302 (test 602 positive).

Next, during an operation 603, a timer is initialised, allocating to it a sufficient period to allow the antenna 106 fixed to the disc 101 to effect several revolutions (for example, if the disc rotates at a speed of 1 rev/sec, it can be chosen to initialise the timer with a period of 5 seconds).

During the test 606 (which follows operations 604 and 605), the zeroing of the timer (which is decremented by cyclic pulses coming from the clock) will indicate the end of this period. During the operation 604, by an interrupt mechanism, triggered at regular time intervals $\Delta t$, the central unit 203 reads the amplitude of the signal received at the station 220, by means of the analogue to digital converter 228. It will be observed that the period $\Delta t$ must be sufficiently small to obtain a precise measurement (for example $\Delta t = 100\ \mu s$. Each value read is stored in random access memory RAM 202, for example in the form of a table, operation 605.

When the downcounting period of the timer has ended, test 606 positive, the instruction to cease transmitting is sent to the base 302, operation 607, this instruction being sent until an acknowledgement is received from the base 302 (test 608 positive).

Then, during an operation 609, the central unit 203 calculates the mean time during which it is possible to transmit without the signal being below the limit value 502. The table of measurements contain two types of values: zero values and non-zero values. The zero values correspond to times where the amplitude of the signal measured was zero (antenna situated in a fade area), the others corresponding to times where the reception quality was correct.

According to a variant, not shown, it is possible to use a non-zero limit, applied to the signal received, in order to decide on good and poor reception times.

In the embodiment described and depicted, the central unit 203 runs through the table, locating the groups of consecutive values which are not zero, operation 609. The central unit 203 counts each group and its size in terms of number of values making it up. Next, operation 610, the central unit 203 calculates the mean size of the groups, and multiplies it by the value of the time interval $\Delta t$. This result gives the mean period during which it is possible to transmit.

Knowing the modulation rate and using the result of the start of the operation 610, the central unit 203 reduces the size of the data frames, operation 610 (for example: if it was found that the mean size of the groups was 40, the mean period during which it is possible to transmit is $40*\Delta t$, that is to say 4 ms. If the modulation used is 1 Mbit/s, during this period it is possible to transmit 4194 bits, or, rounded to a power of 2, 4096 bits, that is to say 512 bytes. Frames of 512 bytes are therefore used.

Next, the central unit 203 informs the base 302 of the size of the frames to be used, operation 611, until the base 302 acknowledges this value (test 612 positive). Finally, the central unit 203 informs the base 302 that the copier 100 is ready to operate, operation 613, until the base 302 acknowledges this information (test 614 positive).

FIG. 7 illustrates the flow diagram of the sub-program resident in read only memory of the printing device presented in FIG. 9 and implementing the present invention. This sub-program is executed when the printing device is awake. In standby mode, the antenna fixed to a moving part does not move. The sub-program explained here makes it possible to place the antenna in an optimum position.

During an operation 701, the sub-program requests the base 302 to send an acknowledgement. During a test 702, the station determines whether or not it is receiving this acknowledgement. When the result of the test 702 is negative (this means that the radio link with the base 302 is broken), during an operation 703, the movement of the carriage and/or of the ink cartridge mechanically connected to the antenna is demanded, operation 703.

After having moved the antenna by a few centimeters, operation 703, operation 701 and test 702 are successively reiterated. When the result of test 702 is positive, during a test 704, it is determined whether or not the awake mode is terminated. When the result of test 704 is negative, during an operation 705, a timer is initialised, and then the passage to zero of this timer is determined (test 706 is positive) in order to make the system wait for a certain length of time before recommencing operations 701 to 704.

When the result of test 704 is positive, the sub-program is ended and the printing system operates in a conventional fashion, using the data received from the base, over the radio link.

FIG. 8 illustrates, in flow diagram form, another operating mode different from that presented in FIG. 6. This sub-program is executed at each initialisation of the copier 100. It is assumed here that the antenna 102 is fixed to the inertia flywheel 101 of the copier 100 and that it is possible to choose the speed of rotation of this flywheel 101 and of the antenna 102, but that the size of frames exchanged is fixed.

During a first operation 801 of the sub-program, the central unit 203 causes the disc to rotate at a constant speed ($N_1$ rev/sec).

Next, the central unit 203 sends to the base 302 the instructions to transmit data continuously, operation 802. The instruction is sent until an acknowledgement is received from the base 302 (test 803 positive).

Then, during an operation 804, the central unit 203 initialises a timer with a sufficient period to enable the antenna 102 fixed to the disc 101 to make several revolutions.

The passage to zero of the timer (test 807 positive) will indicate the end of this period. Next, by means of an interrupt mechanism, triggered every $\Delta t$ seconds, the central unit 203 reads the value of the signal received at the station, by means of the analogue to digital converter 228, operation 805. The period $\Delta t$ must be sufficiently small to obtain a precise measurement (for example $\Delta t=100\ \mu s$). The central unit 203 stores in random access memory 202 each value read, for example in the form of a table (operation 806).

When the timer passes through the value zero (operation 807 positive), the central unit 203 sends to the base 302 the instruction to cease transmitting, operation 808, and this instruction is sent until an acknowledgement is received from the base (test 809 positive).

Then the central unit 203 calculates the mean time during which it is possible to transmit without difficulty, operation 810, in the same way as during the operation 609 (FIG. 6).

Knowing the size of the frames and the modulation used and using the result of the operation 810, the central unit 203 calculates the new speed $N_2$ of rotation to be applied to the disc, operation 811 (for example: if it was found that the means size of the groups was 40, the mean period during which it is possible to transmit is $40*\Delta t$, that is to say $t_1=4$ ms. If the modulation used is 1 Mbit/s and frames of 1024 bytes are transmitted, $t_2=7.8$ ms are needed to transmit a frame. $N_2=N_1*(t_1/t_2)$ rev/s is derived therefrom.

Finally, during an operation 812, the central unit 203 modifies the speed of the disc 101. Finally, the operation 813 and test 814 are respectively identical to the operation 613 and test 614.

In another embodiment, the moving part of the device according to the present invention is placed in a printing system 100 using inkjet printing technology. A cartridge 902 including an ink reservoir and a print head is mounted on a carriage 903 made to move along guide means 904 formed by parallel rods and rails. The carriage 903 is moved in reciprocation along these guide means 904. It is driven by a motor (not referenced), by means of a belt mechanism 905, well known to persons skilled in the art. The path of movement of the carriage 903 and therefore of the print head 902 is parallel to a line to be printed on a printing medium, such as a sheet of paper. This printing medium is moved perpendicularly to the path of movement of the carriage by the printer mechanism, known per se.

In this other embodiment, an antenna 102 is fixed to the cartridge 902 or to the carriage 903.

FIG. 10 depicts an operating mode different from that presenting in FIG. 6. it depicts the flow diagram of the sub-program resident in the read only memory of the copier 100 implementing the method of the present invention. This sub-program is executed each time the copier 100 is initialised.

It is assumed here that the antenna 102 is fixed to the inertia flywheel 101 of the copier 100 and that it rotates uniformly during the use of the copier 100.

The operations 1001 to 1003 are respectively identical to the operations 601 to 603. During an operation 1004, the data received are stored in the random access memory RAM 202.

Then the operations 1005 to 1007 are respectively identical to the operations 606 to 608. Next, the central unit 203 calculates the mean error rate, during an operation 1008, and the information redundancy level necessary, during an operation 1009, to make the error correction effective. For example, if a high error rate is found, it is necessary to increase the redundancy level accordingly.

During an operation 1010, the central unit 203 informs the base 302 of the calculated redundancy and awaits an acknowledgement in return (test 1011 positive).

Finally, operations 1012 and 1013 are respectively identical to operations 613 and 614.

It should be noted here that, in the flow diagrams illustrated in FIGS. 6 and 8, the station requests the base to send continuously a radio signal which does not include any information and the station measures the amplitude of the signal which it receives. On the other hand, in the flow diagram illustrated in FIG. 10, the station requests the base to send a signal representing a binary sequence known to this station and determines the number of errors affecting the signal which it receives.

According to a third embodiment, illustrated in FIG. 11, the device which is the object of the present invention is placed in a printing system using inkjet printing technology.

In this third embodiment, the antenna 907 is fixed and is mounted to the body of the printer 100. A metallic reflector 906 is fixed to the carriage 903.

The flow diagram implemented in this embodiment of the present invention is identical to that illustrated in FIG. 7.

What is claimed is:

1. A data processing device cooperating with a digital apparatus which has a certain function independent of the data processing device, the digital apparatus comprising a moving component that moves relative to the digital apparatus and affects the certain function of the digital apparatus, said data processing device comprising:

communication means for communicating data in the form of electromagnetic signals, said communication means including a moving part arranged for modifying an electromagnetic environment of said communication means; and means for attaching said moving part to the moving component.

2. A data processing device according to claim 1, wherein the moving part is an antenna.

3. A data processing device according to claim 1, wherein the moving part is a metallic reflector.

4. A data processing device according to any one of claims 1, to 3, wherein the digital apparatus is an item of office equipment.

5. A data processing device according to claim 4, wherein the moving component is an inertia flywheel incorporated in the item office equipment.

6. A data processing device according to claim 4, wherein the moving component is a print carriage incorporated in the item office equipment.

7. A data processing device according to claim 1, further comprising a frame duration determination means, adapted to yield a frame duration is less than or equal to a mean duration of periods of good communication.

8. A data processing device according to claim 1, further comprising a good communication cycle ratio determination means that determines a mean ratio of a period of good communication during a cycle to a duration of the cycle.

9. A data processing device according to claim 1, further comprising:

a means for determining a new cycle duration equal to or greater than a product of a former cycle duration and a ratio of a duration of a data frame used by said communication means to a duration of good communication; and a means of controlling the duration of the cycle to make the cycle have the new cycle duration.

10. A data processing device according to claim 1, wherein the moving part is driven by a print carriage on an item of office equipment that uses data received by said communication device.

11. A data processing device according to claim 1, further comprising a means for determining a ratio of redundancy information associated with data to be communicated, the ratio being a function of a good communication cycle ratio.

12. A data processing device according to claim 1, further comprising a good communication determination means, wherein when said good communication determination means determines that a communication is not good, the moving part is set in movement.

13. A data communication method comprising a step of setting in movement a moving component of a digital apparatus, the digital apparatus having a certain function independent of data communication, the moving component affecting the certain function of the digital apparatus and being attached to a moving part of a communication means for communicating data in the form of electromagnetic signals, wherein the moving part modifies an electromagnetic environment of the communication means when the moving component is set in motion.

14. A data communication method according to claim 13, wherein the moving part is an antenna.

15. A data communication method according to any one of claims 13 or 14, wherein, during said setting step, the moving part is fixed to a moving member of an item of office equipment that uses data received by the communication device.

16. A data communication method according to any one of claims 13 or 14, wherein during said setting step, the moving part effects cyclic movement in such a way that a change to the electromagnetic environment caused by the cyclic movement has a same cycle period as the movement of the moving part.

17. A data communication method according to claim 13, further comprising a step of determining a mean duration of periods of good communication.

18. A data communication method according to claim 13, further comprising a frame duration determination step, wherein a frame duration is less than or equal to a mean duration of periods of good communication.

19. A data communication method according to any one of claims 13 or 14, further comprising a good communication cycle ratio determination step during which a mean ratio of a duration of good communication during a cycle to a duration of the cycle is determined.

20. A data communication method according to claim 13, further comprising:

a step of determining a new cycle duration equal to or greater than a product of a former cycle duration and a ratio of the duration of a data frame used by the communication means to a duration of good communication, and a step of controlling a duration of a cycle during which the cycle is made to have the new cycle duration.

21. A data communication method according to any one of claims 13 or 14, further comprising a step of determining a ratio of redundancy information associated with data to be communicated, the ratio being a function of a good communication cycle ratio.

22. A data communication method according to any one of claims 13 or 14, further comprising a good communication determination step, wherein when said good communication determination step determines that a communication is not good, said setting step is performed.

23. A network implementing the data communication method according to any one of claims 13 or 14.

24. A computer implementing the data communication method according to any one of claims 13 or 14.

25. A copier implementing the data communication method according to any one of claims 13 or 14.

26. A facsimile implementing the data communication method according to any one of claims 13 or 14.

27. A printer implementing the data communication method according to any one of claims 13 or 14.

28. A scanner implementing the data communication method according to any one of claims 13 or 14.

29. A camera implementing the data communication method according to any one of claims 13 or 14.

* * * * *

UNITED STATES PATENT AND TRADEMARK OFFICE

CERTIFICATE OF CORRECTION

PATENT NO. : 6,442,403 B1
DATED : August 27, 2002
INVENTOR(S) : Becot et al.

It is certified that error appears in the above-identified patent and that said Letters Patent is hereby corrected as shown below:

Title page,
Item [57], ABSTRACT,
Line 6, "Preferentially" should read -- Preferably, --.

Drawings,
Sheet 6 of 10, Figure 7, Box 702, "Sent" should read -- Send --.
Sheet 7 of 10, Figure 8, Box 802, "Sentd" should read -- Send --.
Sheet 9 of 10, Figure 10, Box 1010, "redudacy" should read -- redundancy --.

Column 1,
Line 21, "paths. Notably" should read -- paths, notably --.

Column 6,
Line 56, "µs." should read -- µs). --.

Column 7,
Line 21, "4 ms." should read -- 4 ms). --.

Column 8,
Line 30, "means" should read -- mean --; and
Line 56, "presenting" should read -- presented --, and "it depicts" should read -- It depicts --.

Signed and Sealed this

Eighteenth Day of February, 2003

JAMES E. ROGAN
*Director of the United States Patent and Trademark Office*